No. 640,400. Patented Jan. 2, 1900.
J. A. MILLER.
THRESHING MACHINE.
(Application filed Apr. 11, 1899.)
(No Model.) 2 Sheets—Sheet 1.

Witnesses  John A. Miller Inventor
By his Attorneys,

No. 640,400. Patented Jan. 2, 1900.
J. A. MILLER.
THRESHING MACHINE.
(Application filed Apr. 11, 1899.)
(No Model.) 2 Sheets—Sheet 2.

Witnesses
Chas. H. Durand
W. F. Bernhard

By his Attorneys,
C. A. Snow & Co.

John A. Miller Inventor

UNITED STATES PATENT OFFICE.

JOHN A. MILLER, OF WADESVILLE, INDIANA.

THRESHING-MACHINE.

SPECIFICATION forming part of Letters Patent No. 640,400, dated January 2, 1900.

Application filed April 11, 1899. Serial No. 712,645. (No model.)

*To all whom it may concern:*

Be it known that I, JOHN A. MILLER, a citizen of the United States, residing at Wadesville, in the county of Posey and State of Indiana, have invented a new and useful Threshing-Machine, of which the following is a specification.

My invention relates to improvements in threshing-machines; and the object in view is to provide a simple construction for effectually separating the grain from straw without the employment of the ordinary straw-carrier or rake mechanism which are common in the familiar types of threshing-machines.

In my machine I employ a combined feeder and separator arranged longitudinally of the machine frame or casing to extend substantially from the threshing-cylinder to a stacker mechanism, and this feeder and separator embodies devices by which the straw is lifted and agitated and other devices for generating currents of air which are directed against the straw to eliminate the grain therefrom and to force the straw rearwardly toward the stacker mechanism. Beneath this feeder and separator is a longitudinal concave grate that supports the straw in its rearward travel through the machine, and said grate is formed with slots to insure the passage of the grain therethrough. Below the grate is an imperforate grain-pan, which collects the grain as it falls through said grate, and at the tail end of said pan is a cleaning-shoe having a fan. An endless conveyer operates over the grain-pan to sweep the grain from the latter and deposit the grain and chaff on the riddles of the cleaning-shoe. The several working elements of the machine are driven from a single power-shaft by suitable gearing, and these elements are operated in unison to thresh the grain, to separate the straw from the grain, to clean the grain from the chaff, and to carry the straw to the pile or rick.

The invention consists in the novel combination of elements and in the construction and arrangement of parts, which will be hereinafter fully described and claimed.

To enable others skilled in the art to understand the invention, I have illustrated a preferred embodiment thereof in the accompanying drawings, forming a part of this specification, and in which—

Figure 1:
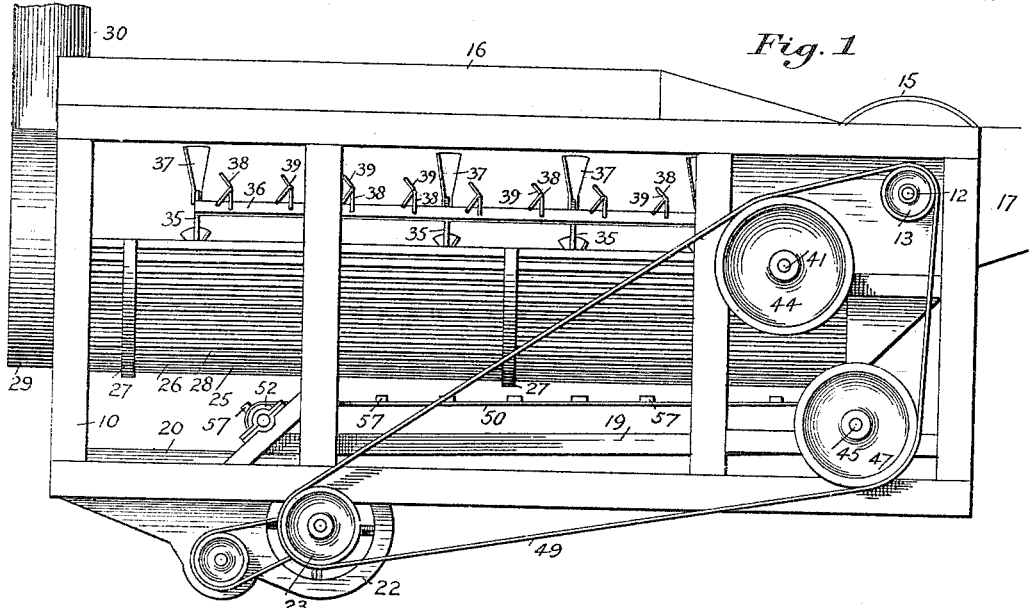
Figure 2:
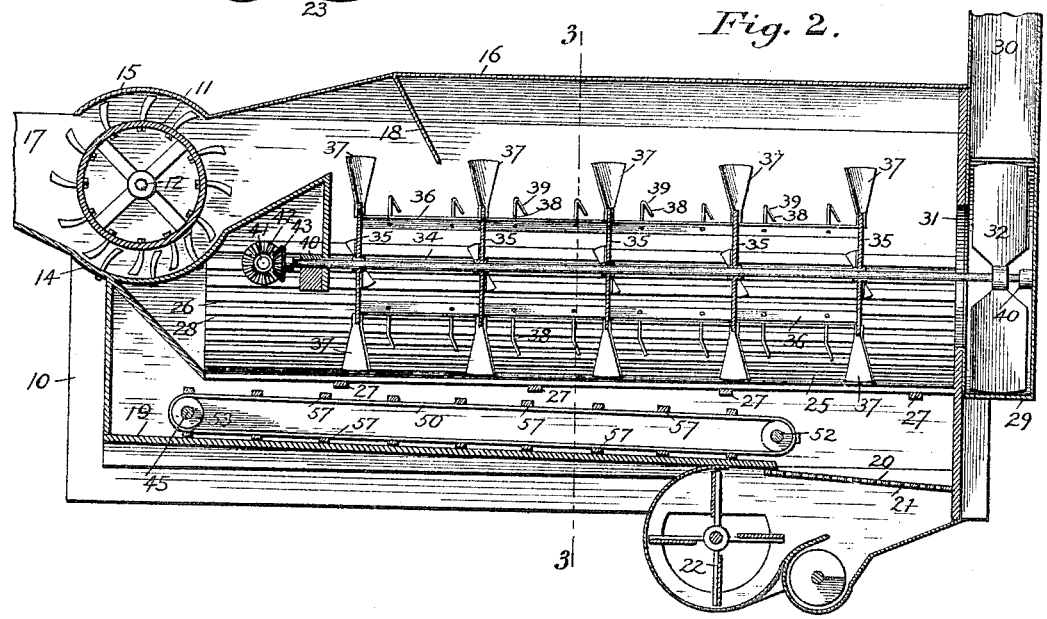
Figure 3:
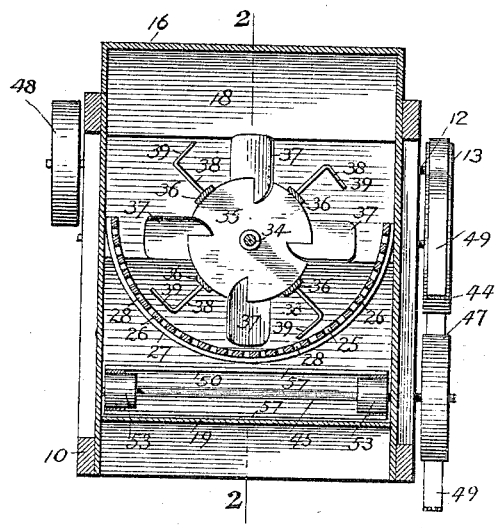
Figure 4:
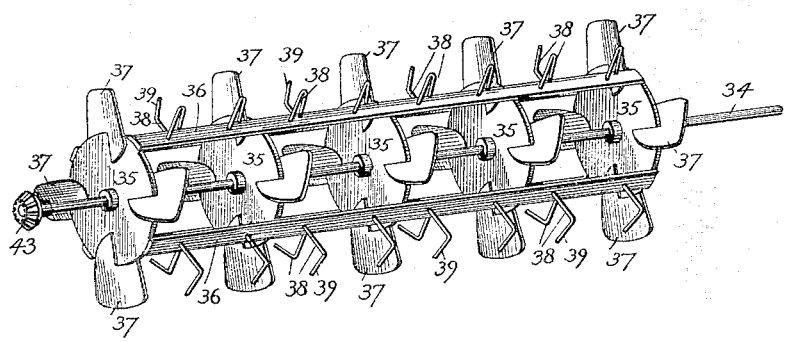

Figure 1 is a side elevation with the machine-casing skeletonized and illustrating my improvements embodied in a threshing-machine. Fig. 2 is a longitudinal sectional elevation taken centrally through the machine on a plane indicated by the dotted line 2 2 of Fig. 3. Fig. 3 is a vertical transverse sectional elevation on the plane indicated by the dotted line 3 3 of Fig. 2. Fig. 4 is a detail perspective view of the revoluble feeder and separator removed from the threshing-machine.

The same numerals of reference are used to indicate like and corresponding parts in each of the several figures of the drawings.

10 designates the frame of my improved threshing-machine, to which is applied the casing in the usual or any preferred way, and this frame and casing are carried by wheeled axles for transportation of the machine.

11 is the spiked threshing-cylinder, which has its shaft 12 journaled in suitable bearings on the frame 10, and one end of this shaft is extended beyond the machine-casing to receive a pulley 13. This spiked concave 14 is secured within the machine-frame in the usual way to occupy an operative relation to the revoluble threshing-cylinder, and over said cylinder is disposed a cap 15. The deck 16 of the machine-casing joins the cap 15 in the ordinary way. A grain-board 17 is extended beyond the delivery end of the concave 14 for the purpose of depositing the grain and straw upon the revoluble feeder and separator, and in rear of this inclined grain-board is a deflector 18. This deflector is secured to the deck 16 of the machine-casing in a position at a suitable point in rear of the inclined grain-board, and said deflector is inclined reversely to the grain-board, so as to direct the straw in a downward and rearward direction upon the revoluble feeder and separator. This inclined deflector 18 prevents the straw as it comes from the threshing mechanism from following closely to the line of the deck 16, and the straw is thus properly deposited upon the feeder and separator to be subjected to the action of the devices entering into the construction of said feeder and separator and which serve to agitate the straw and to generate currents of air that act against the grain for eliminating the latter from the straw.

In the lower part of the machine-casing on a horizontal plane below the threshing mechanism is secured an imperforate grain-pan 19, that extends longitudinally of the machine-casing from the end thereof to a point over the cleaning-shoe. The cleaning-shoe 20 is supported or suspended within the machine-frame in the usual or any preferred manner, and said shoe is equipped with one or more riddles 21. As shown by the drawings, I have represented the cleaning-shoe as equipped with a single riddle 21; but it will be understood that the ordinary construction of shoe with a series of riddles may be employed in my machine. The blast-fan 22 is arranged in advance of the riddles of said shoe 20, and the fan-shaft has one end extended beyond the machine-casing to receive a driving-pulley 23.

One of the novel features of my improved threshing-machine resides in the employment of a grate 25, which extends longitudinally from a point below the concave 14 to the straw-stacker mechanism. This longitudinal grate is concave in cross-section, and it extends over the grain-pan and the cleaning-shoe, as represented clearly by Fig. 2. Said longitudinal grate may consist of perforated sheet metal secured in place within the frame of the machine-casing; but, as shown by the drawings, I prefer to employ a grate which consists of a series of longitudinal slats or rails 26, disposed in an arc of a circle and secured at intervals to a series of bed-bars 27, which are fastened to the machine frame or casing, whereby the grate is firmly supported in proper position longitudinally within the machine-casing and between the threshing mechanism and the stacker mechanism. The slats or rails 26 of the grate are secured to the bed-bars 27 in spaced relation to each other in order to form a plurality of slots or openings 28, which extend longitudinally of the grate and provide for the free passage of the grain through said grate; but at the same time the slats or rails prevent to a large extent the passage of the straw with the grain to the cleaning-shoe, whereby the straw is retained upon the grate to be supported thereby as it is fed through the threshing-machine by the action of the revoluble feeder and separator, and the straw is thus exposed to the action of said beater and separator continuously during its travel through the machine after it passes the threshing mechanism.

At the rear end of the machine is a fan-casing 29, which communicates with a stacker-tube 30, said casing and tube being supported on the machine-frame in the usual or any preferred manner. Said fan has an eye or inlet 31 on a plane above the longitudinal grate 25, and in said casing is arranged an exhaust-fan 32.

Another important feature of my improved threshing-machine is the revoluble feeder and separator, which is hung or supported over the longitudinal grate 25 and is arranged concentric therewith for its parts to sweep close to the surface of the grate. In the construction of this feeder and separator I prefer to employ a central shaft 34, a series of blast-heads 35, and a series of longitudinal toothed bars 36. The blast-heads are spaced upon and fixed to a central shaft 34 at suitable intervals, and said heads are arranged, preferably, in parallel relation to each other. Each head is in the form of a disk, and it carries a series of wings or blades 37, which are secured at proper intervals to the peripheral edge of the head, whereby the wings or blades extend beyond the circular outline of the head. Said wings or blades on the blast-head are disposed obliquely to the plane of the head and to the axis of the central shaft 34, and said wings are caused by the rapid rotation of the feeder and separator to generate currents of air of sufficient strength to blow the grain from the straw, and thereby separate the grain, so that it will fall by gravity upon the longitudinal grate 25, whereby the grain is adapted to pass through the slots in the grate and lodge upon the grain-pan or the riddle of the shoe. The bars 36 are disposed longitudinally of the feeder and separator parallel to the central shaft 34 thereof, and these bars are attached to or connected with said shaft, preferably by fastening the bars to the blast-heads in the intervals between the blades or wings 37 thereon. Each bar carries a series of outwardly-extending teeth 38, and as a series of the bars 36 are employed it will be seen that the feeder and separator is equipped with a plurality of teeth 38, which extend at numerous points beyond the blast-heads throughout the length of the longitudinal feeder and separator. The teeth 38 on the bars of the revoluble feeder and separator are of angular form, and the outer ends 39 of said teeth are bent at right angles to the axis of the bars, said ends 39 of teeth being inclined to the axis of the shaft and the plane of the blast-heads in order to have their angular outer ends incline toward the stacker mechanism. This construction and arrangement of the angular teeth on the bars of the feeder and separator serve a twofold purpose. First, the teeth during the rotation of the feeder and separator operate to lift and loosen the straw, so that the currents from the blades of the blast-heads will penetrate the mass of straw to act on the grain, and the inclination of the ends 39 of said teeth causes them to feed or force the straw longitudinally through the machine toward the stacker mechanism.

The central shaft 34 of the revoluble feeder and separator is journaled at its ends in bearings 40, which are suitably supported within the machine-frame contiguous to the threshing mechanism and the stacker mechanism, and in the embodiment of the invention represented more clearly by Fig. 2 the tail end of this shaft 34 extends clearly through the casing of the stacker-fan, whereby the fan 32 may be attached directly to the shaft in order to rotate therewith for exhausting air from the threshing-machine and carrying the straw into the stacker-tube 30.

The central shaft of the revoluble feeder and separator is driven from a counter-shaft 41 through intermeshing gears 42 43. Said counter-shaft is journaled in suitable bearings on the machine-casing below the threshing mechanism, and to the inner end of said counter-shaft is secured a bevel-gear, as 42, which intermeshes with a similar bevel-gear 43 on one end of the central shaft 34. Said counter-shaft has its other end extended beyond the machine-casing, and to it is secured a driving-pulley 44.

The conveyer-driving shaft 45 of the machine is journaled in proper bearings 46, which are secured to the machine-casing on a plane above the imperforate grain-pan 19. The protruding end of this shaft is equipped with a pulley 47 around the pulley 48, which is fast to the cylinder-shaft and is adapted to pass a driving-belt from a traction-engine or other source of power, whereby the shaft 12 may be driven to positively actuate the several working elements of the machine through the endless driving-belt 49, which is fitted to the pulley 47 of said shaft 12. Said belt is furthermore arranged to fit on the pulley 23 of the fan-shaft, the pulley 44 on the counter-shaft 41, and the pulley 13 of the threshing-cylinder shaft. It will thus be seen that the belt 49 is adapted to drive the shoe-fan, the counter-shaft for the longitudinal feeder and separator, and the shaft of the threshing-cylinder from the cylinder-shaft, and the central shaft 34 of the feeder and separator operates to rotate the stacker-fan.

It will be understood that the grain-pan 19 receives a part of the grain and chaff from the longitudinal grate of the feeder and separator, and in order to deposit the grain and chaff upon the riddle of the cleaning-shoe I employ an endless conveyer 50, which is arranged to sweep over said grain-pan. This endless conveyer is provided with a series of slots 57, that are adapted to travel in close relation to said pan 19, and the strands or belts of this conveyer are fitted to an idler-roller 52, which is supported in the machine-frame over the riddle of the cleaning-shoe. The other end of said endless conveyer 50 is fitted to pulleys or rollers 53 on the power-shaft 45, and said conveyer is thus operated by the power-shaft for its slats to sweep the grain and chaff from the grain-pan upon the riddle of the shoe. To deliver the grain and chaff from the pan to the shoe, I prefer to arrange the shoe-riddle on a horizontal plane below the pan and to extend the delivery end of said pan over the shoe, so that the grain will not pass between the contiguous ends of the pan and shoe-riddle, all as clearly represented by Fig. 2.

This being the construction of my threshing-machine, the operation may be described as follows: The grain in sheaves or bundles is fed in a loosened condition to the cylinder and concave of the threshing mechanism and is subjected to the action of spikes or teeth thereon. The rotation of the cylinder forces the grain over the inclined board and against the inclined deflector, and the threshed grain lodges upon the revoluble feeder and separator and on the concave longitudinal grate. The rotation of the shaft 34 causes the angular teeth to lift up and loosen the straw, and as said shaft is rotated at a considerable speed by the counter-shaft the diagonal wings or blades on the blast-heads generate currents of air of sufficient strength to penetrate the loosened straw and act against the grain to separate the latter from the straw. The teeth of the revoluble feeder and separator and the energy developed by the currents of air from the wings or blades from the blast-heads act on the straw to carry it rearwardly through the machine to the stacker mechanism, and the grain loosened from the straw by the action of said feeder and separator falls through the slots in the concave grate. The grain is thus permitted to lodge on the longitudinal pan 19 and the riddle of the cleaning-shoe, and the conveyer 50 moves the grain and chaff from said pan upon said shoe-riddle. This grain and chaff are exposed to the blast from the shoe-fan 22, and the chaff is blown out of the shoe and the machine, while the grain passes through the riddles into suitable conveying devices, by which it is carried out of the machine. The straw is prevented by the slotted grate from passing to the grain-cleaning devices of the machine, and said grate delivers the straw to the eye or opening of the stacker-fan. This fan is driven from the longitudinal shaft 34, and it acts on the straw to force it through the stacker-tube that conveys the straw to the pile or rick.

Changes in the form, proportion, size, and the minor details of construction within the scope of the appended claims may be resorted to without departing from the spirit or sacrificing any of the advantages of this invention.

What I claim is—

1. In a threshing-machine, the combination with a threshing mechanism, and a stacker mechanism, of a stationary concave or grate arranged between said mechanisms, and a revoluble feeder and separator arranged longitudinally within a chamber of the machine-casing and mounted to sweep in close relation to said grate, said feeder and separator being equipped with a plurality of blast devices and with a plurality of straw-separating teeth, said blast devices and the separating-teeth being disposed in alternate relation, substantially as described.

2. In a threshing-machine, a revoluble feeder and separator comprising a shaft, a series of blast-heads attached at intervals to said shaft, bars revoluble with said shaft, and teeth secured to said bars and arranged outside of the blast-heads and in planes between the latter, substantially as described.

3. In a threshing-machine, a revoluble feeder and separator comprising a shaft, a series of blast-heads secured at intervals to said shaft, oblique wings or blades secured to said blast-heads and arranged in a plurality of series longitudinally of the shaft, and straw-separating teeth also carried by the shaft and arranged in the plurality of series longitudinally thereof, said series of straw-separating teeth alternating with the series of wings or blades, substantially as described.

4. In a threshing-machine, a revoluble feeder and separator comprising a shaft, a plurality of series of blast wings or blades secured at intervals to said shaft and with each wing disposed in a plane oblique to the axis of said shaft, and the toothed bars connected to said shaft to be revoluble therewith and disposed in the intervals between the blades or wings, substantially as described.

5. In a threshing-machine, a revoluble feeder and separator comprising a shaft, a series of blast-heads having the diagonal wings or blades, and longitudinal bars fixed to said heads in the intervals between said blades and having the projecting straw-teeth, substantially as described.

6. In a threshing-machine, a revoluble feeder and separator comprising a shaft, a series of blast wings or blades revoluble with said shaft, and longitudinal bars secured to the shaft in the intervals between said blades or wings and having the projecting straw-teeth alternating with the blast wings or blades, substantially as described.

7. In a threshing-machine, a revoluble feeder and separator comprising a shaft, a series of bars secured to said shaft to rotate therewith, and angular teeth fixed to the bars and having their active ends arranged to project beyond said bars and to lie obliquely to the axis of the shaft, substantially as described.

8. In a threshing-machine, a revoluble feeder and separator comprising a shaft, a series of blast-heads secured at intervals to said shaft, and each provided with the oblique wings or blades, a series of longitudinal bars arranged in the intervals between the blades, and a series of teeth fixed to each of said bars and inclined to the axis of the shaft, substantially as described.

9. In a threshing-machine, a revoluble feeder and separator comprising a shaft, a series of blast-heads secured at intervals to said shaft, the wings or blades secured in series to each of said blast-heads, longitudinal bars fastened to the heads in the intervals between the blades or wings, and a series of angular teeth secured to each of said longitudinal bars and having their outer ends inclined to the axis of the shaft, substantially as described.

10. In a threshing-machine, the combination with a threshing mechanism, and a pneumatic stacker mechanism, of a horizontal stationary concaved grate supported longitudinally within a chamber of the machine-casing and below said thresher mechanism and the inlet to the stacker mechanism, and a revoluble feeder and separator mounted parallel to said grate, said feeder and separator provided with a plurality of series of blast devices and with a similar series of straw-separating teeth which alternate with said blast devices, said teeth or blast devices arranged to sweep in close relation to the concave surface of the grate, substantially as described.

11. In a threshing-machine, the combination with a threshing mechanism, a cleaner-shoe, and a stacker mechanism, of a grain-pan arranged to deliver to said shoe, a perforated concaved grate arranged between the threshing and stacker mechanisms and above the grain-pan, a rotary separator and feeder arranged longitudinally above the grate and having a plurality of blast devices and of separating-fingers arranged to sweep close to the concave surface of the grate, and an endless conveyer arranged between the grate and the grain-pan to sweep close to the surface of the latter, substantially as described.

In testimony that I claim the foregoing as my own I have hereto affixed my signature in the presence of two witnesses.

JOHN A. MILLER.

Witnesses:
  KELLY DEFAR,
  L. G. LEOPOLD.